United States Patent
Han et al.

(10) Patent No.: US 9,460,336 B2
(45) Date of Patent: Oct. 4, 2016

(54) APPARATUS AND METHOD FOR EXTRACTING FEATURE OF DEPTH IMAGE

(75) Inventors: Jae Joon Han, Seoul (KR); Byung In Yoo, Seoul (KR); Chang Kyu Choi, Bundang-gu (KR); Sung Joo Suh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 487 days.

(21) Appl. No.: 13/290,623

(22) Filed: Nov. 7, 2011

(65) Prior Publication Data

US 2012/0183203 A1    Jul. 19, 2012

(30) Foreign Application Priority Data

Jan. 13, 2011    (KR) ........................ 10-2011-0003452

(51) Int. Cl.
*G06K 9/46* (2006.01)
*G06K 9/00* (2006.01)
*G06T 7/00* (2006.01)
*G06K 9/34* (2006.01)

(52) U.S. Cl.
CPC ....... *G06K 9/00201* (2013.01); *G06K 9/00335* (2013.01); *G06K 9/00355* (2013.01); *G06K 9/00382* (2013.01); *G06K 9/00523* (2013.01); *G06K 9/34* (2013.01); *G06K 9/46* (2013.01); *G06T 7/0051* (2013.01); *G06T 7/0057* (2013.01)

(58) Field of Classification Search
USPC ................ 382/154, 173, 181, 190, 203, 224
See application file for complete search history.

(56) References Cited

U.S. PATENT DOCUMENTS

| | | | |
|---|---|---|---|
| 6,775,403 B1* | 8/2004 | Ban et al. | 382/154 |
| 8,611,604 B2* | 12/2013 | Fujiyoshi | G06T 7/004 |
| | | | 382/154 |
| 2002/0064382 A1* | 5/2002 | Hildreth et al. | 396/100 |
| 2003/0156756 A1* | 8/2003 | Gokturk et al. | 382/190 |
| 2006/0007533 A1* | 1/2006 | Eichhorn et al. | 359/368 |
| 2006/0291697 A1* | 12/2006 | Luo | G06K 9/00369 |
| | | | 382/224 |
| 2007/0122027 A1* | 5/2007 | Kunita et al. | 382/154 |
| 2009/0102788 A1* | 4/2009 | Nishida et al. | 382/106 |
| 2009/0244090 A1* | 10/2009 | Zhang et al. | 382/154 |
| 2010/0049675 A1* | 2/2010 | Ning et al. | 706/12 |
| 2010/0098301 A1* | 4/2010 | Zhou | 382/154 |

FOREIGN PATENT DOCUMENTS

| | | |
|---|---|---|
| JP | 2008-294785 | 12/2008 |
| KR | 10-2000-0041329 | 7/2000 |
| KR | 10-2003-0064703 | 8/2003 |
| KR | 10-0806201 | 2/2008 |
| KR | 10-2008-0067544 | 7/2008 |

OTHER PUBLICATIONS

Thomas Coogan and Alistair Sutherland, "Transformation Invariance in Hand Shape Recognition", IEEE, The 18th International Conference on Pattern Recognition, vol. 3, 2006, pp. 485-488.*
Ronen Gvili, Amir Kaplan, Eyal Ofek and Giora Yahav, "Depth Keying", SPIE, Proceedings of SPIE, vol. 5006, May 2003, pp. 1-11.*

\* cited by examiner

*Primary Examiner* — Eric Rush
(74) *Attorney, Agent, or Firm* — NSIP Law

(57) ABSTRACT

Provided is a feature extraction method and apparatus to extract a feature of a three-dimensional (3D) depth image. The feature extraction apparatus may generate a plurality of level sets using a depth image, and may extract a feature for each level depth image.

17 Claims, 4 Drawing Sheets

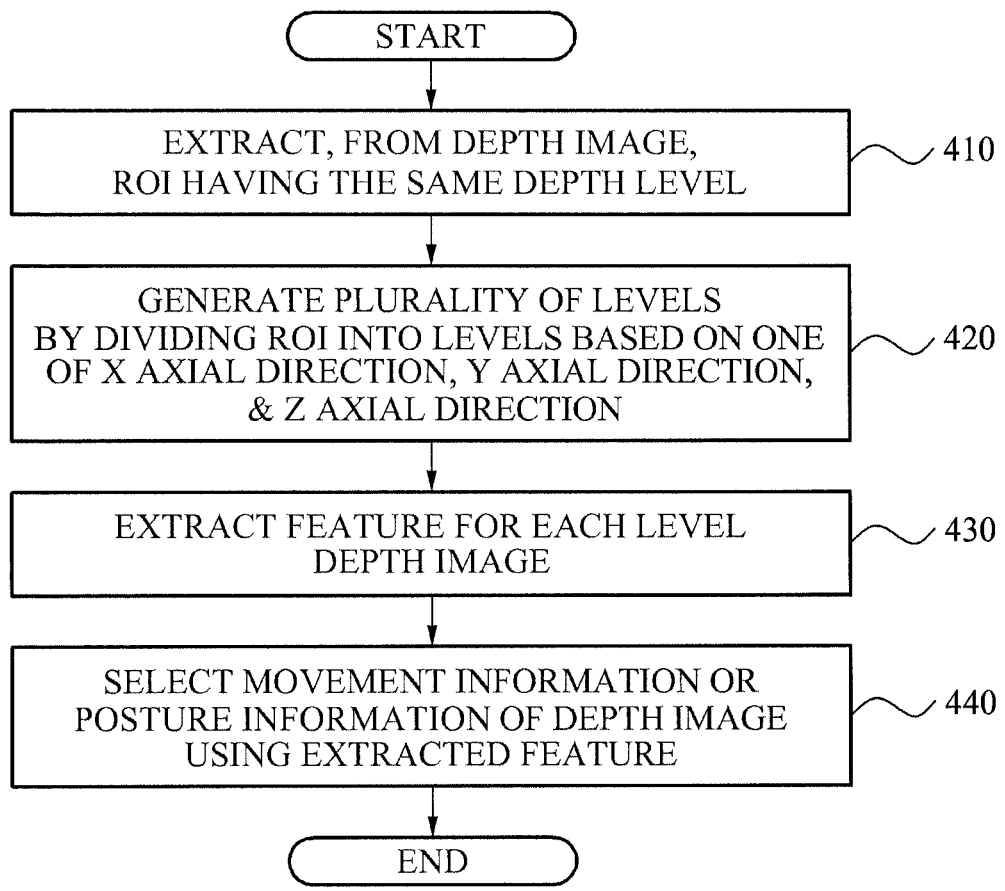

APPARATUS AND METHOD FOR EXTRACTING FEATURE OF DEPTH IMAGE

CROSS-REFERENCE TO RELATED APPLICATIONS

This application claims the priority benefit of Korean Patent Application No. 10-2011-0003452, filed on Jan. 13, 2011, in the Korean Intellectual Property Office, the disclosure of which is incorporated herein by reference.

BACKGROUND

1. Field

Example embodiments relate to technology of extracting a feature of a depth image.

2. Description of the Related Art

As an example of a method to extract a feature of a three-dimensional (3D) image, the feature may be extracted by segmenting a plane and the like in a point cloud of a 3D depth image. The above method may correspond to a complex calculation method, for example, a random sample consensus (RanSac) and the like and thus, may have many constraints in high speed calculation and may perform a precise feature extraction when a structure of a corresponding image is known.

As another example, a method of extracting a contour, for example, a silhouette of an object in a 3D image, and using a moment for estimating of a shape of the extracted contour may be employed. However, the above method may use depth information of the 3D image only for extracting the contour and thus, may not utilize a 3D feature.

As still another example, a method of configuring a volume pixel (voxel), estimating depth information for each voxel, and using an eigenvalue analysis, for example, a principle component analysis and the like based on the estimated depth information may be employed.

SUMMARY

The foregoing and/or other aspects are achieved by providing an apparatus for extracting a feature, including: a level set generator to generate a plurality of level sets using a depth image; and a feature extractor to extract a feature for each level depth image.

The level set generator may generate the plurality of level sets by extracting, from the depth image, a region of interest (ROI) having the same depth level, and by dividing the extracted ROI into a plurality of levels.

The level set generator may divide the ROI into a plurality of levels based on one of an X axial direction, a Y axial direction, and a Z axial direction, and generates the plurality of level sets using the plurality of levels.

The level set generator may acquire, as an $i^{th}$ level set among the plurality of level sets, a depth image having a predetermined pixel value matching depth information of an $i^{th}$ level, a depth image having a pixel value greater than depth information of the $i^{th}$ level, or a depth image having a pixel value between depth information of the $i^{th}$ level and depth information of an $(i+1)^{th}$ level, and i denotes a natural number.

The depth information of the $i^{th}$ level may correspond to a depth threshold of the $i^{th}$ level.

The feature extractor may extract the feature from a depth image of each level using a descriptor extracting shape information.

The feature extraction apparatus may further include an information selector to select movement information or posture information corresponding to the extracted feature.

The information selector may generate a feature vector using the extracted feature, and generates a classifier using the feature vector.

The information selector may identify a learning sample matching a feature of a depth image newly acquired through an image acquirement unit, and may selects movement information or posture information of the newly acquired depth image.

The foregoing and/or other aspects are achieved by providing an apparatus for extracting a feature, including: a level set generator to divide a region of interest (ROI) extracted from a depth image based on a predetermined direction; and a feature extractor to extract the feature based on a two-dimensional (2D) boundary of the depth image.

The level set generator may divide the ROI based on one of an X axial direction, a Y axial direction, and a Z axial direction.

The feature extractor may divide the depth image based on a predetermined interval, extract boundary of the depth image, and extract the feature based on the boundary of the depth image.

The foregoing and/or other aspects are achieved by providing an apparatus for extracting a feature, including: an image acquirement unit to acquire a depth image; a level set generator to generate a plurality of levels using the acquired depth image; and a feature extractor to extract a feature for each level depth image.

The foregoing and/or other aspects are achieved by providing a method of extracting a feature, including: generating a plurality of levels using a depth image; and extracting a feature for each level depth image.

According to example embodiments, since a feature is extracted from a depth image divided for each level, an invariable feature is enabled with respect to a rotation and a distance associated with a depth direction.

According to example embodiments, a feature extracted from a 3D depth image may be used to recognize a posture available in a 2D image.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which:

FIG. 4 illustrates a method of extracting a feature according to example embodiments.

DETAILED DESCRIPTION

Figure 1:
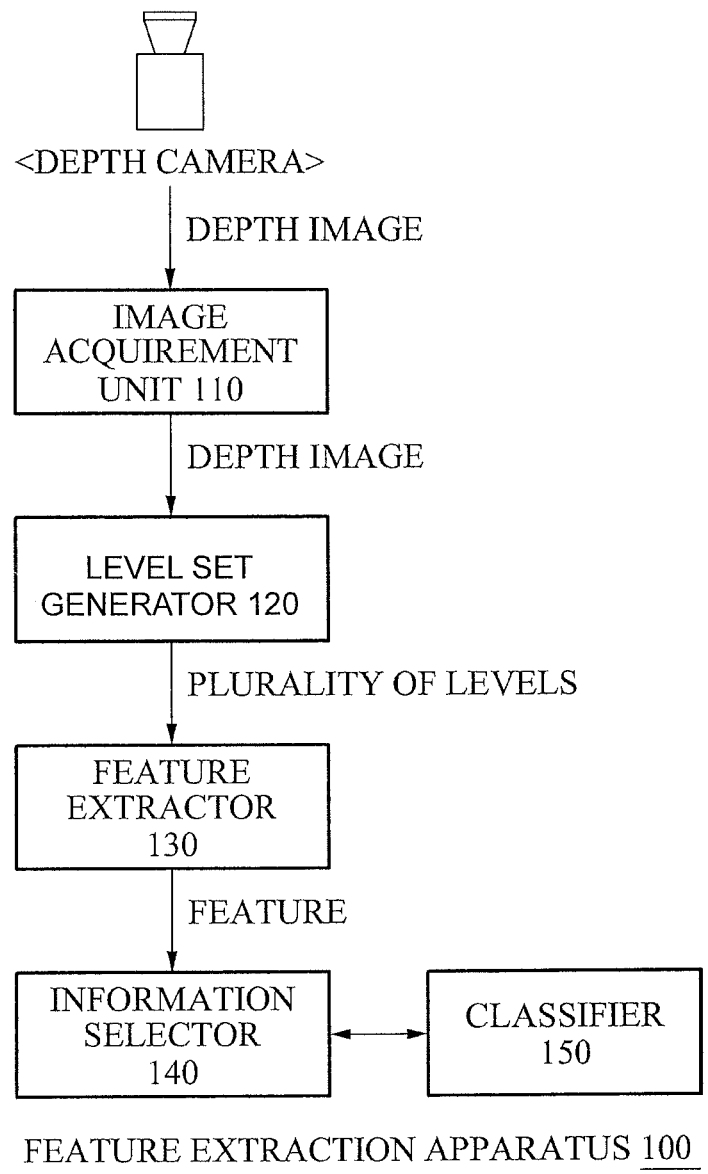
FIG. 1 illustrates a configuration of a feature extraction apparatus according to example embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates a configuration of a feature extraction apparatus 100 according to example embodiments.

Referring to FIG. 1, the feature extraction apparatus 100 may include an image acquirement unit 110, a level set generator 120, a feature extractor 130, an information selector 140, and a classifier 150.

The image acquirement unit 110 may acquire a depth image using a depth camera. The depth camera may generate a three-dimensional (3D) depth image using a time of flight (TOF) scheme. The depth camera may have a relatively low resolution and precision compared to a color camera, and be utilized to acquire a 3D image.

The level set generator 120 may generate a plurality of level sets using the acquired depth image. For example, the level set generator 120 may extract, from the depth image, a region of interest (ROI) having the same depth level. When the depth image corresponds to a hand movement of a user, the ROI may indicate a partial region of a depth image received from a sensor or the depth camera to generate motion information associated with the hand movement of the user. The level set generator 120 may generate the plurality of level sets by dividing the extracted ROI into a plurality of levels.

Figure 2:
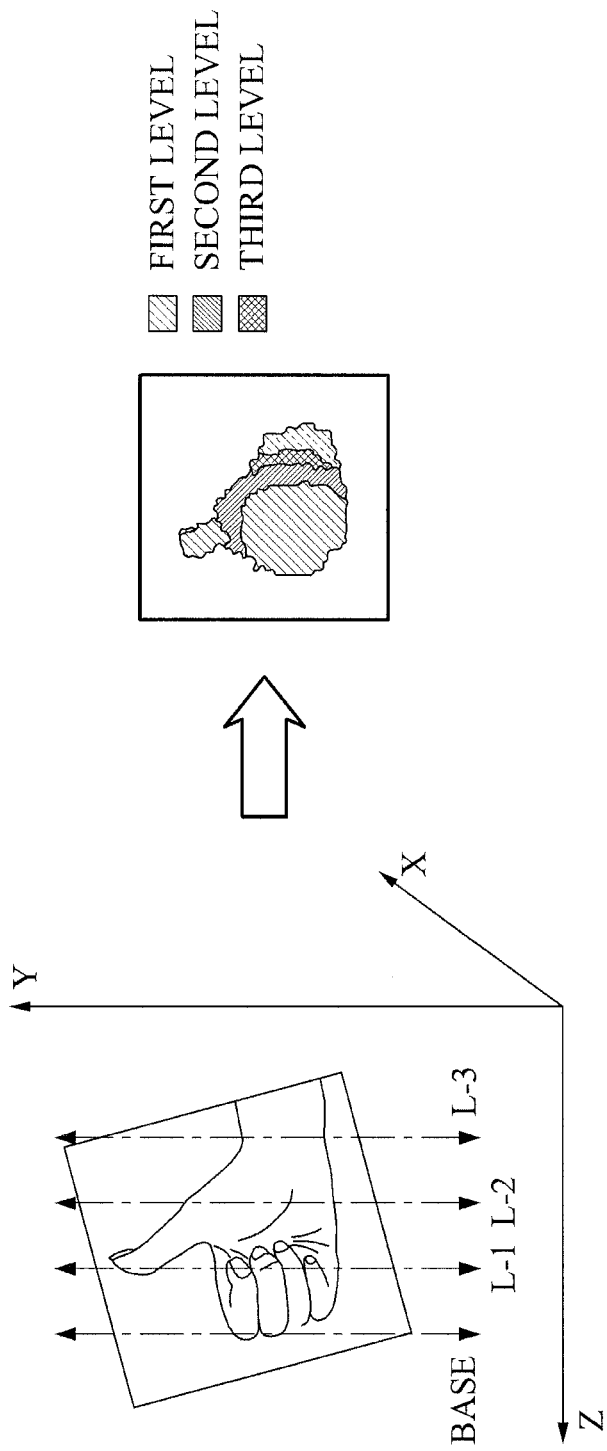
FIG. 2 illustrates an example of generating a plurality of level sets using a depth image according to example embodiments.

FIG. 2 illustrates an example of generating a plurality of level sets using a depth image according to example embodiments.

Referring to FIG. 2, the level set generator 120 may divide the ROI into a plurality of levels based on one of an X axial direction, a Y axial direction, and a Z axial direction. Even though the level division is performed based on the Z axial direction in FIG. 2, the level division may be performed based on the X axial direction or the Y axial direction depending on embodiments.

The level set generator 120 may divide the ROI into the plurality of levels, for example, L-1, L-2, and L-3 based on the Z axial direction, and may generate the plurality of level sets, for example, a first level, a second level, and a third level, using the divided plurality of levels.

As one example, the level set generator 120 may acquire, as an $i^{th}$ level set among the plurality of level sets, a depth image having a predetermined pixel value matching depth information of an $i^{th}$ level. Here, i denotes a natural number. In this example, the $i^{th}$ level set may be expressed by Equation 1:

$$Level_i(P) = \begin{cases} 1, & \text{if } d(p) = d_i \\ 0, & \text{otherwise} \end{cases} \quad \text{[Equation 1]}$$

In Equation 1, p denotes a pixel position (x, y) of the depth image, d(p) denotes depth information of each pixel, and $d_i$ denotes a depth threshold of the $i^{th}$ level. Accordingly, the level set generator 120 may acquire, as the $i^{th}$ level set, a depth image having a pixel value '1' matching $i^{th}$ depth information.

As another example, the level set generator 120 may acquire, as the $i^{th}$ level set, a depth image having a pixel value greater than depth information of the $i^{th}$ level. In this example, the $i^{th}$ level set may be expressed by Equation 2:

$$Level_i(P) = \begin{cases} 1, & \text{if } d(p) \geq d_i \\ 0, & \text{otherwise} \end{cases} \quad \text{[Equation 2]}$$

In Equation 2, p denotes a pixel position (x, y) of the depth image, d(p) denotes depth information of each pixel, and $d_i$ denotes a depth threshold of the $i^{th}$ level. Accordingly, the level set generator 120 may acquire, as the $i^{th}$ level set, a depth image having a pixel value greater than depth information of the $i^{th}$ level, for example, a depth image satisfying $d(p) \geq d_i$.

As still another example, the level set generator 120 may acquire, as the $i^{th}$ level set, a depth image having a pixel value between depth information of the $i^{th}$ level and depth information of an $(i+1)^{th}$ level. In this example, the $i^{th}$ level set may be expressed by Equation 3:

$$Level_i(P) = \begin{cases} 1, & \text{if } d_{i+1} > d(p) \geq d_i \\ 0, & \text{otherwise} \end{cases} \quad \text{[Equation 3]}$$

In Equation 3, p denotes a pixel position (x, y) of the depth image, d(p) denotes depth information of each pixel, and $d_i$ denotes a depth threshold of the $i^{th}$ level. Accordingly, the level set generator 120 may acquire, as the $i^{th}$ level set, a depth image having a pixel value between depth information of the $i^{th}$ level and depth information of an $(i+1)^{th}$ level, that is, a depth image satisfying $d_{i+1} > d(p) \geq d_i$.

In the aforementioned embodiment, a depth axis may not be an actual depth axis and may be a depth axis based on a depth camera or an axis determined in an actual space.

A number of depth images acquired using the aforementioned method may be determined based on a number of levels. The feature extractor 130 may extract the feature by employing all the schemes used for 2D image processing, using the acquired depth images.

The feature extractor 130 may extract the feature from a depth image of each level using a descriptor extracting shape information. For example, the feature extractor 130 may calculate a Hu moment for each level image and then extract the feature.

The feature extractor 130 may divide the depth image based on a predetermined interval, extract a boundary of the depth image, and extract the feature based on the boundary of the depth image.

The information selector 140 may select movement information or posture information corresponding to the extracted feature. For example, the information selector 140 may generate a feature vector using the extracted feature, and may generate the classifier 150 using the feature vector. In this example, the information selector 140 may perform a component reduction to reduce a number of feature vectors.

The classifier 150 may generate a learning sample using the generated feature vector. The learning sample may be used to classify a newly input depth image. For example, the classifier 150 may identify a learning sample matching a feature of a depth image newly acquired through the image acquirement unit 110.

The information selector 140 may select movement information or posture information of the newly acquired depth image using the identified learning sample. The classifier 150 may be included as a constituent element of the information selector 140. In this case, the information selector 140 may generate a learning sample using the generated feature vector, by the classifier 150, and may identify the learning sample matching a feature of the newly acquired depth image.

Figure 3:
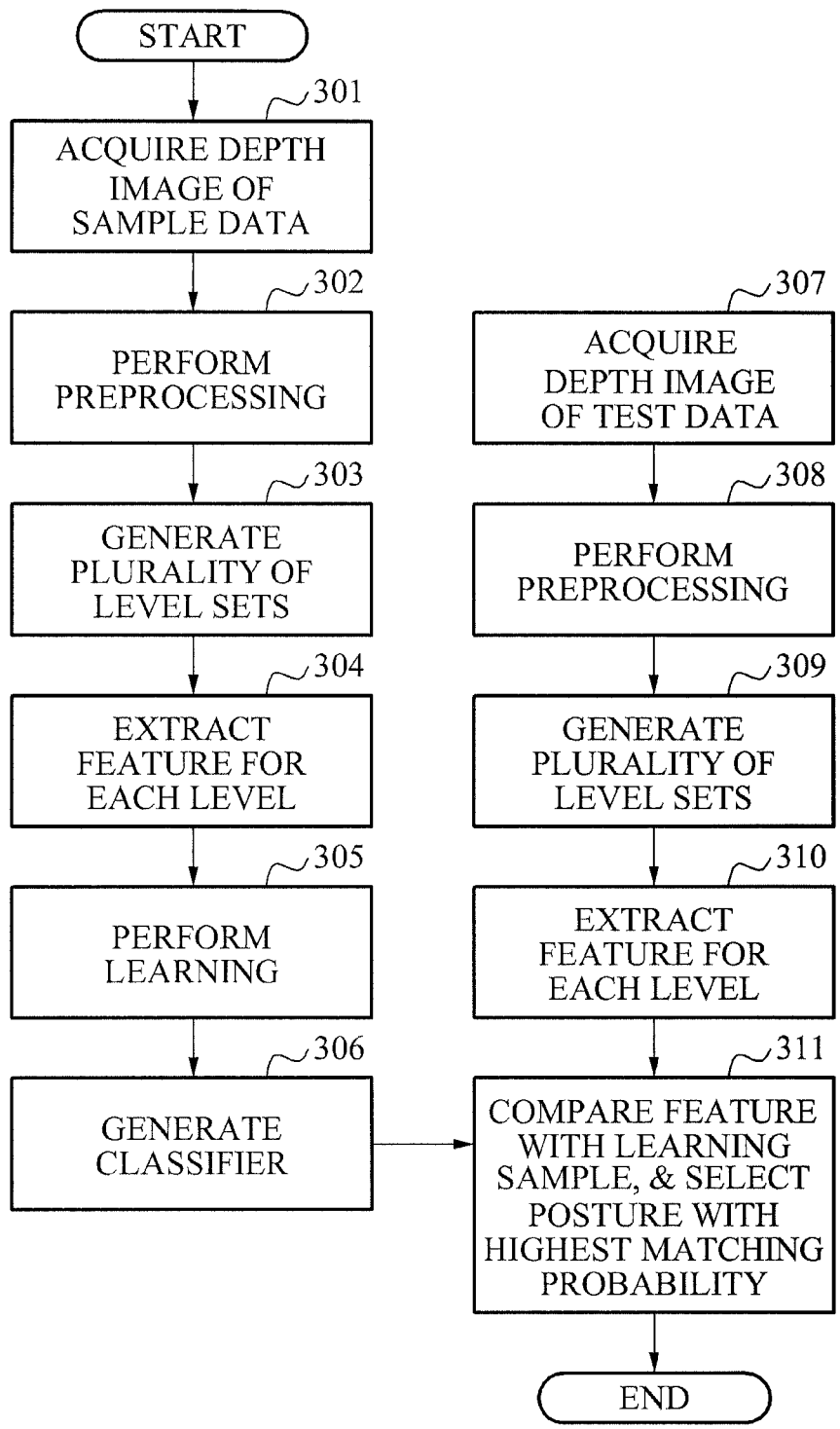
FIG. 3 illustrates an algorithm of a posture estimation method using a level set scheme according to example embodiments.

FIG. 3 illustrates an algorithm of a posture estimation method using a level set scheme according to example embodiments.

Referring to FIG. 3, in operation 301, the feature extraction apparatus 100 may acquire a depth image of sample data.

In operation 302, the feature extraction apparatus 100 may preprocess the acquired depth image. In operation 302, the feature extraction apparatus 100 may extract an ROI by employing image processing technology, for example, a noise reduction method, an ROI selection, smoothing, and the like.

In operation 303, the feature extraction apparatus 100 may generate a plurality of level sets by dividing the extracted ROI into a plurality of levels based on one of an X axial direction, a Y axial direction, and a Z axial direction.

In operation 304, the feature extraction apparatus 100 may extract a feature for each level depth image based on a level set. In operation 304, the feature extraction apparatus 100 may extract a boundary of a depth image corresponding to a distance that is spaced apart by a predetermined interval from a point closest to a 3D depth image, for example, a user hand and the like. In operation 304, the feature extraction apparatus 100 may extract the feature from the extracted depth image using a descriptor capable of extracting a shape.

In operation 305, the feature extraction apparatus 100 may perform learning using the extracted feature. In operation 305, the feature extraction apparatus 100 may learn the classifier 150 by employing the extracted feature as a feature vector.

In this example, the feature extraction apparatus 100 may not use all the features extracted from all the levels. In particular, in operation 306, the feature extraction apparatus 100 may learn the classifier 150 using a partial set of features used to classify each posture, using an eigenvalue analysis and the like. The above learning method may use adaboosting (AdaBoost), a decision tree, a supporting vector machine, and the like. The learned classifier 150 may be used for a depth image of test data.

For example, the classifier 150 may generate a feature vector using the extracted feature, and may generate and maintain a learning sample using the generated feature vector. The classifier 150 may perform a component reduction to reduce a number of feature vectors.

In operation 307, the feature extraction apparatus 100 may acquire a depth image of test data.

In operation 308, the feature extraction apparatus 100 may preprocess the acquired depth image. Similar to the preprocessing of operation 302, the feature extraction apparatus 100 may extract an ROI by employing image processing technology, for example, a noise reduction method, an ROI selection, smoothing, and the like.

In operation 309, the feature extraction apparatus 100 may generate a plurality of level sets by dividing the extracted ROI into a plurality of levels based on one of an X axial direction, a Y axial direction, and a Z axial direction. For example, an $i^{th}$ level among the plurality of levels may correspond to a depth image having a predetermined pixel value matching depth information of an $i^{th}$ level, a depth image having a pixel value greater than depth information of the $i^{th}$ level, or a depth image having a pixel value between depth information of the $i^{th}$ level and depth information of an $(i+1)^{th}$ level. Here, i denotes a natural number.

In operation 310, the feature extraction apparatus 100 may extract the feature for each level depth image based on a level set.

In operation 311, the feature extraction apparatus 100 may compare the extracted feature and the learning sample, and may select movement information or posture information having a highest matching probability.

For example, the feature extraction apparatus 100 enables the feature extracted from the depth image of test data to pass the classifier 150, and may select movement information or posture information having a highest confidence. For example, when the depth image corresponds to a hand of a user, the movement information may include a motion of the hand or a shape of the hand. The posture information may include a thumbs-up posture or a thumbs-down posture associated with the hand of the user.

Accordingly, the feature extraction apparatus 100 may be applicable to an interface apparatus using posture recognition of the user.

FIG. 4 illustrates a method of extracting a feature according to example embodiments.

The feature extraction method may be performed by the feature extraction apparatus 100.

In operation 410, the feature extraction apparatus 100 may extract an ROI having the same depth level. The depth image may be acquired using a depth camera. When the depth image corresponds to a hand movement of a user, the ROI may indicate a partial region of a depth image received from a sensor or the depth camera to generate motion information associated with the hand movement of the user.

In operation 420, the feature extraction apparatus 100 may divide the ROI into a plurality of levels based on one of an X axial direction, a Y axial direction, and a Z axial direction, and may generate a plurality of level sets using the divided plurality of levels. For example, the feature extraction apparatus 100 may divide the ROI into at least one level based on the Z axial direction and generate the plurality of level sets.

In operation 430, the feature extraction apparatus 100 may extract the feature for each level depth image.

As an example, the feature extraction apparatus 100 may acquire, as an $i^{th}$ level set among the plurality of level sets, a depth image having a predetermined pixel value matching depth information of an $i^{th}$ level. In this example, the predetermined pixel value may be 1 and the depth information may be a depth threshold of the $i^{th}$ level.

As another example, the feature extraction apparatus 100 may acquire, as the $i^{th}$ level set, a depth image having a pixel value greater than depth information of the $i^{th}$ level.

As still another example, the feature extraction apparatus 100 may acquire, as the $i^{th}$ level set, a depth image having a pixel value between depth information of the $i^{th}$ level and depth information of an $(i+1)^{th}$ level.

The feature extraction apparatus 100 may extract the feature using a descriptor extracting shape information from each level depth image.

The feature extraction apparatus 100 may divide the depth image based on a predetermined interval, extract a boundary of the depth image, and extract the feature based on the extracted boundary of the depth image.

In operation 440, the feature extraction apparatus 100 may select movement information or posture information of the depth image using the extracted feature.

The feature extraction apparatus 100 may generate a feature vector using the extracted feature, and may generate the classifier 150 using the generated feature vector. The classifier 150 may generate a learning sample using the generated feature vector. Next, the feature extraction apparatus 100 enables the feature extracted from a newly acquired depth image to pass the classifier 150, and may identify a learning sample matching a feature of the newly acquired depth image and select movement information or posture information of the newly acquired depth image using the identified learning sample.

The feature extraction method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An apparatus for extracting a feature, comprising:
a processor, comprising;
   a level set generator to generate a plurality of level sets using a plurality of depth image divided based on a predetermined interval, and the plurality of depth image having a pixel value according to depth information of each level;
   a feature extractor to extract a feature for each level set of the plurality of depth image,
   wherein the level set generator generates the plurality of level sets by comparing depth information of each pixel in the plurality of depth image with depth thresholds to generate binary values for each level of the plurality of level sets, wherein each depth threshold corresponds to a respective level of the plurality of level sets, and
   wherein the feature extractor extracts the feature from a depth image of each level using a descriptor extracting shape information: and
   an information selector to select movement information or posture information corresponding to the extracted features.

2. The apparatus of claim 1, wherein the level set generator generates the plurality of level sets by extracting, from the plurality of depth image, a region of interest (ROI) having the same depth level, and by dividing the extracted ROI into a plurality of levels.

3. The apparatus of claim 2, wherein the level set generator divides the ROI into a plurality of levels based on one of an X axial direction, a Y axial direction, and a Z axial direction, and generates the plurality of level sets using the plurality of levels.

4. The apparatus of claim 1, wherein the level set generator acquires, as an $i^{th}$ level set among the plurality of level sets, a depth image having a pixel value '1' matching depth information of an $i^{th}$ level, a depth image having a pixel value greater than depth information of the $i^{th}$ level, or a depth image having a pixel value between depth information of the $i^{th}$ level and depth information of an $(i+1)^{th}$ level, and i denotes a natural number.

5. The apparatus of claim 4, wherein the depth information of the $i^{th}$ level corresponds to a depth threshold of the $i^{th}$ level.

6. The apparatus of claim 1, wherein the feature extractor extracts the feature for each level set by calculating a Hu moment.

7. The apparatus of claim 1, wherein the information selector generates a feature vector using the extracted features, and generates a classifier using the feature vector.

8. The apparatus of claim 7, wherein the information selector selects movement information or posture information having a highest matching probability.

9. The apparatus of claim 1, wherein the information selector identifies a learning sample matching a feature of a depth image newly acquired through an image acquirement unit, and selects movement information or posture information of the newly acquired depth image.

10. An apparatus for extracting a feature comprising:
a processor, comprising;
   an image acquirement unit to acquire a plurality of depth image divided based on a predetermined interval;
   a level set generator to generate a plurality of levels using the plurality of depth image having a pixel value according to depth information of each level;
   a feature extractor to extract a feature for each level depth image,
   wherein the level set generator generates the plurality of levels by comparing depth information of each pixel in the plurality of depth image with depth threshold to generate binary values for each level of the plurality of levels, wherein each depth threshold correspond to a respective level of the plurality of levels, and
   wherein the feature extractor extracts the feature from a depth image of each level using a descriptor extracting shape information; and
   an information selector to select movement information or posture information corresponding to the extracted features.

11. The apparatus of claim 10, wherein the level set generator generates the plurality of levels by extracting, from the acquired plurality of depth image, a region of interest (ROI) having the same depth level, and by dividing the extracted ROI into the plurality of levels based on one of an X axial direction, a Y axial direction and a Z axial direction.

12. The apparatus of claim 10, further comprising:
a classifier to generate a feature vector using the extracted features, to generate a learning sample using the generated feature vector, and to identify a learning sample matching a feature vector of a depth image newly acquired through the image acquirement unit.

13. The apparatus of claim 12, wherein the information selector is configured to select movement information or posture information of the newly acquired depth image using the identified learning sample.

14. A method of extracting a feature, comprising:
generating a plurality of levels using a plurality of depth image divided based on a predetermined interval, and the plurality of depth image having a pixel value according to depth information of each level;
extracting a feature for each level of the plurality of depth image,
wherein the generating comprises:
generating the plurality of levels by comparing depth information of each pixel in the plurality of depth image with depth threshold to generate binary values for each level of the plurality of levels, wherein each depth threshold correspond to a respective level of the plurality of levels, and wherein the feature extractor comprises extracting the feature from a depth image of each level using a descriptor extracting shape information; and selecting movement information or posture information corresponding to the extracted features.

15. The method of claim 14, wherein the generating further comprises:

extracting, from the plurality of depth image as a region of interest (ROI), a region having the same depth level; and generating the plurality of levels by dividing the ROI into the plurality of levels based on one of an X axial direction, a Y axial direction, and a Z axial direction.

16. The method of claim 14, wherein an $i^{th}$ level among the plurality of levels corresponds to a depth image having a pixel value '1' matching depth information of an $i^{th}$ level, a depth image having a pixel value greater than depth information of the $i^{th}$ level, or a depth image having a pixel value between depth information of the $i^{th}$ level and depth information of an $(i+1)^{th}$ level, and i denotes a natural number.

17. The method of claim 14, wherein the generating comprises:

generating a feature vector using the extracted features;

generating a learning sample using the feature vector;

identifying a learning sample matching a feature vector of a newly acquired depth image; and selecting movement information or posture information of the newly acquired depth image using the identified learning sample.

* * * * *